(12) United States Patent
Shanley et al.

(10) Patent No.: US 7,274,657 B2
(45) Date of Patent: Sep. 25, 2007

(54) METHODS AND APPARATUS FOR PROVIDING REDUNDANCY IN AN ASYNCHRONOUS DATA TRANSFER AND SOURCE TRAFFIC CONTROL SYSTEM

(75) Inventors: Timothy M. Shanley, Orange, CT (US); Ronald P. Novick, Orange, CT (US); Sing Ngee Yeo, Stratford, CT (US)

(73) Assignee: Transwitch Corporation, Shelton, CT (US)

( * ) Notice: Subject to any disclaimer, the term of this patent is extended or adjusted under 35 U.S.C. 154(b) by 1052 days.

(21) Appl. No.: 10/328,086

(22) Filed: Dec. 23, 2002

(65) Prior Publication Data

US 2004/0120251 A1 Jun. 24, 2004

(51) Int. Cl.
*H04L 1/00* (2006.01)
*G06F 13/00* (2006.01)
(52) U.S. Cl. ............................ 370/225; 710/100
(58) Field of Classification Search ................ None
See application file for complete search history.

(56) References Cited

U.S. PATENT DOCUMENTS

| | | | |
|---|---|---|---|
| 3,982,077 A | 9/1976 | Clark et al. ............. 179/15 BV |
| 3,985,962 A | 10/1976 | Jones et al. ............. 179/15 AL |
| 4,149,144 A | 4/1979 | Diefenderfer ........... 340/147 R |
| 4,156,798 A | 5/1979 | Doelz ..................... 179/15 AL |
| 4,375,681 A | 3/1983 | Abbott et al. ................. 370/16 |
| 4,460,993 A | 7/1984 | Hampton et al. ............ 370/84 |
| 4,488,293 A | 12/1984 | Haussmann et al. .......... 370/84 |
| 4,660,169 A | 4/1987 | Norgren et al. ............. 364/900 |
| 4,685,101 A | 8/1987 | Segal et al. .................... 370/84 |
| 4,727,536 A | 2/1988 | Reeves et al. ................ 370/84 |
| 4,750,168 A | 6/1988 | Trevitt ......................... 370/85 |
| 4,763,320 A | 8/1988 | Rudolph et al. .............. 370/85 |
| 4,789,926 A | 12/1988 | Clarke ........................ 364/200 |
| 4,815,074 A | 3/1989 | Jacobsen ..................... 370/112 |
| 4,817,037 A | 3/1989 | Hoffman et al. ............ 364/200 |
| 5,084,872 A | 1/1992 | Le Cucq et al. ........... 370/94.2 |
| 5,163,048 A | 11/1992 | Heutink ..................... 370/85.6 |
| 5,172,373 A | 12/1992 | Suzuki ..................... 370/85.11 |
| 5,263,023 A | 11/1993 | Sevenhans et al. ...... 370/85.11 |
| 5,276,678 A | 1/1994 | Hendrickson et al. ........ 370/62 |
| 5,299,193 A | 3/1994 | Szczepanek ............... 370/85.1 |
| 5,452,330 A | 9/1995 | Goldstein .................... 375/257 |
| 5,572,686 A | 11/1996 | Nunziata et al. ............ 395/296 |
| 5,901,146 A * | 5/1999 | Upp ............................. 370/389 |
| 6,052,753 A * | 4/2000 | Doerenberg et al. ........ 710/305 |
| 6,104,724 A | 8/2000 | Upp ............................. 370/458 |
| 6,535,513 B1 * | 3/2003 | Kao et al. ................. 370/395.1 |

\* cited by examiner

*Primary Examiner*—Huy D. Vu
*Assistant Examiner*—Clemence Han
(74) *Attorney, Agent, or Firm*—Gordon & Jacobson, PC

(57) ABSTRACT

Methods and apparatus for providing redundancy in an asynchronous data transfer and source traffic control system include configuring a primary client and a backup client with the same receive address but different transmit addresses. This allows both clients to receive the same traffic flows by utilizing a common receive address while maintaining independent transmit identity allowing each client to communicate with other clients in the system. The methods of the present invention are compatible with a CellBus® system operating in either 16-client mode or 32-client mode.

24 Claims, 3 Drawing Sheets

FIG. 2 - PRIOR ART

| CLOCK CYCLE | 32 BITS | | | |
|---|---|---|---|---|
| 0 | REQUEST FIELD | | | |
| 1 | INTERNAL ROUTING FIELD (OPTIONAL) | | | |
| 2 | A B C D VPI | | VCI | P T I CLP |
| 3 | BYTE 3 | BYTE 2 | BYTE 1 | BYTE 0 |
| 4 | BYTE 7 | BYTE 6 | BYTE 5 | BYTE 4 |
| 5 | BYTE 11 | BYTE 10 | BYTE 9 | BYTE 8 |
| 6 | BYTE 15 | BYTE 14 | BYTE 13 | BYTE 12 |
| 7 | BYTE 19 | BYTE 18 | BYTE 17 | BYTE 16 |
| 8 | BYTE 23 | BYTE 22 | BYTE 21 | BYTE 20 |
| 9 | BYTE 27 | BYTE 26 | BYTE 25 | BYTE 24 |
| 10 | BYTE 31 | BYTE 30 | BYTE 29 | BYTE 28 |
| 11 | BYTE 35 | BYTE 34 | BYTE 33 | BYTE 32 |
| 12 | BYTE 39 | BYTE 38 | BYTE 37 | BYTE 36 |
| 13 | BYTE 43 | BYTE 42 | BYTE 41 | BYTE 40 |
| 14 | BYTE 47 | BYTE 46 | BYTE 45 | BYTE 44 |
| 15 | SYSTEM CONTROL | | | GEN G RNU ANM T |

FIG. 3. PRIOR ART

METHODS AND APPARATUS FOR PROVIDING REDUNDANCY IN AN ASYNCHRONOUS DATA TRANSFER AND SOURCE TRAFFIC CONTROL SYSTEM

This application is related to co-owned U.S. Pat. Nos. 5,901,146 and 6,104,724, the complete disclosures of which are hereby incorporated by reference herein.

BACKGROUND OF THE INVENTION

1. Field of the Invention

This invention relates generally to asynchronous data communication among a bus master and a plurality of bus users. More particularly, this invention relates to methods and apparatus for providing redundancy between a pair of bus users.

2. State of the Art

Data communication among a bus master and a plurality of bus users is well known in the art. Such communication systems generally include a bidirectional data bus to which the bus master and all of the bus users are connected. The bus master typically produces at least one synchronizing clock signal which is received by all of the bus users on a clock bus separate from the data bus. One data unit which is equal to the bus width can be transferred onto the bus or off the bus during one clock cycle. While all bus users can transfer data off the bus simultaneously, only one bus user can transfer data onto the bus during any given clock cycle. The bus user (which could be the bus master) transferring data onto the bus is said to have "access" or to be "active". In order to determine which bus user is given access during a given clock cycle, an arbitration procedure is established. Typically, each bus user is assigned a time slot in a fixed number of time slots called a data "frame". The frame which defines bus access may be provided with one or more time slots for the exchange of control information in addition to the time slots which are assigned to data transfer. As the clock cycles are received by all of the bus users via the clock bus, each bus user waits for its assigned time slot and then transfers data to the bus during its assigned cycle.

It is recognized that, particularly in asynchronous data transfer systems, bus users are not always ready to transfer data onto the bus during their assigned time slot. Conversely, other bus users may accumulate data for transfer onto the bus faster than their assigned access to the frame will allow them to transfer the data onto the bus. Consequently, it is often desirable to adjust the access mechanism to allow some users relatively more access than others; i.e., more slots in the frame. Many sophisticated algorithms have been developed for arbitrating bus access. However, these known systems typically require that each bus user be aware of the arbitration scheme so that each bus user can tell how much access it has been allocated.

Previously incorporated co-owned U.S. Pat. Nos. 5,901, 146 and 6,104,724 disclose an asynchronous data transfer and source traffic control system as shown in prior art FIG. 2. The system includes a bus master 100 and a plurality of bus users, e.g. 112, 114, 116, coupled to a bidirectional data bus 118. The bus master 100 provides two clock signals to each bus user, a system clock 120 and a frame clock 122. The backplane may also include an acknowledge line 126 and a congestion line 128. The frame clock designates the start of a frame. Prior art FIG. 3 illustrates a frame format which preferably includes fifteen or sixteen system clock cycles, the first of which is designated the request field and the last of which includes a grant field. One or more other cycles may be assigned control and/or routing information and the remainder of the cycles comprise a data field of fixed length. During the request field, any number of bus users may request access which is received by the bus master. During the grant field, the bus master grants access to a selected bus user for the entire data portion of the next frame. Which user is granted access to the next frame is determined according to an arbitration algorithm in the bus master which may be unknown to the bus users. The asynchronous data transfer and source traffic control system has particular application in accommodating the transfer of the contents of ATM cells used in BISDN systems. More particularly, this co-owned technology is used in the manufacture of ATM switches and is sold under the brand name CellBus®.

In any telecommunications switch, it is often desirable to provide redundancy so that communications links are not discontinued by an equipment failure. The CellBus® technology supports up to thirty-two clients coupled to a single backplane (bus). A present manner of providing redundancy in a CellBus® switch utilizes the multicast capability inherent in the CellBus® technology. Multicasting allows a primary client and a backup client to continuously receive the identical traffic stream. After the data traffic has been received, the primary client continues operating on the data while the backup client may perform some subset of processing on the data. The primary and backup clients reverse roles in the system during a switch-over procedure.

According to the present manner of providing redundancy, each traffic flow (unique data stream) intended to be sent to both the primary and backup clients occupies one of the CellBus® multicast sessions. A CellBus® multicast session is described as a single traffic source client and multiple destination clients (recipients). Existing CellBus® devices are limited to 256 or 512 multicast sessions in the entire CellBus® system while the system may support thousands of unicast connections. Although there are not enough multicast sessions to be individually allocated to all required unicast connections, it is possible to multiplex multiple traffic flows onto a single CellBus® multicast session. However, this is undesirable because several traffic management functions are rendered useless with this approach. In particular, the following functions are disabled when multiplexing multiple traffic flows onto a single multicast session: ATM header translation, per traffic flow statistics, per VC queuing and scheduling, prioritization among the multicast traffic flows, and enforcement of an AAL5 packet discard policy during periods of congestion.

SUMMARY OF THE INVENTION

It is therefore an object of the invention to provide methods and apparatus for implementing redundancy in a CellBus® system.

It is also an object of the invention to provide methods and apparatus for implementing redundancy in a CellBus® system which do not rely on the multicast function of the system.

It is another object of the invention to provide methods and apparatus for implementing redundancy in a CellBus® system which do not disable traffic management functions.

In accord with these objects which will be discussed in detail below, the methods of the present invention include configuring the primary client and the backup client with the same receive address but different transmit addresses. In particular, according to the presently preferred embodiment, the least significant bit of the transmit address of the backup client is opposite that of the transmit address of the primary client. For example, if the primary client has a transmit and receive address of 4, the backup client will have a transmit address of 5 and a receive address of 4. This allows both clients to receive the same traffic flows by utilizing a common receive address while maintaining independent transmit identity allowing each client to communicate with other clients in the system. Other addressing schemes could be used to assure that backup and primary clients have the same receive address but different transmit addresses. The methods of the present invention are compatible with a CellBus® system operating in either 16-client mode or 32-client mode.

The invention does not require any modification to the CellBus® protocol. During receive operations, the primary and backup client pair both perform the same data cell authentication by comparing the Bit Interleaved Parity (BIP-8) calculated locally with the received BIP-8. A host processor coupled to the clients monitors the presence of alarms and directs the switch over from primary to backup when an alarm indicates a failure in the primary. Prior to switch over the backup client does not transmit any real data but only transmits a "keep alive" signal indicating that it is functioning properly and available to take over the functions of the primary client.

Additional objects and advantages of the invention will become apparent to those skilled in the art upon reference to the detailed description taken in conjunction with the provided figures.

BRIEF DESCRIPTION OF THE DRAWINGS

FIG. 3 illustrates the prior art CellBus® frame.

DETAILED DESCRIPTION OF THE PREFERRED EMBODIMENTS

Figure 1:
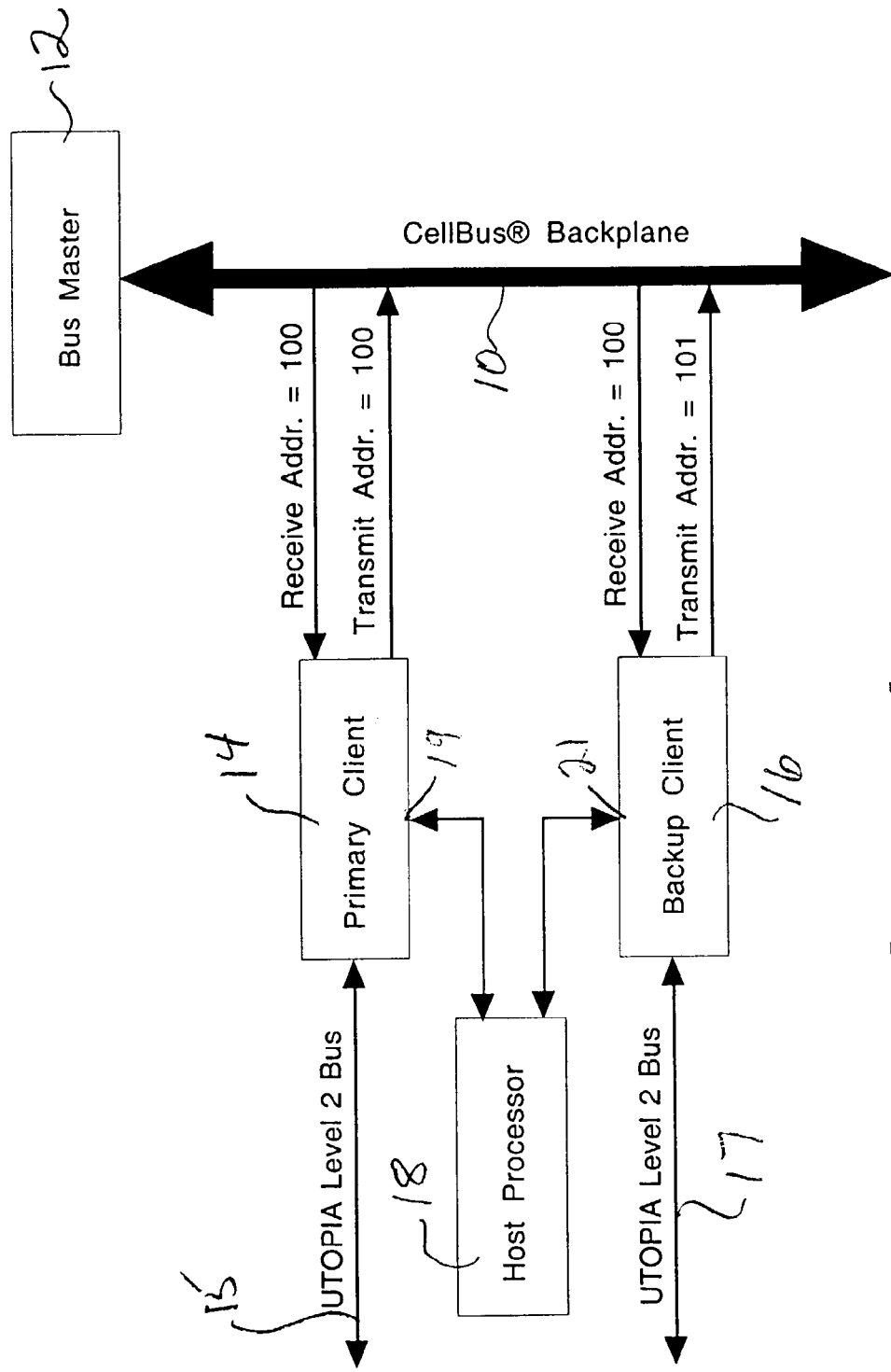
FIG. 1 is a high level schematic diagram illustrating an exemplary implementation of the invention.
Figure 2:
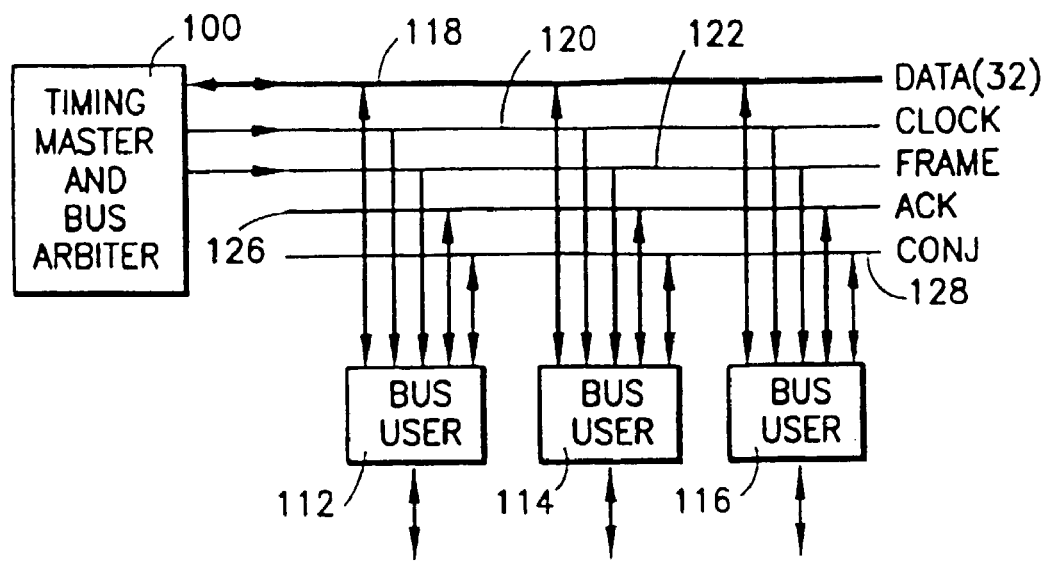
FIG. 2 illustrates the prior art CellBus® system.

Referring now to FIG. 1, an exemplary implementation of the invention includes a CellBus® backplane 10 which is coupled to a bus master 12 and a plurality of clients (only two of which are shown). The illustrated clients are a primary client 14 and a backup client 16. Each client is provided with a UTOPIA Level 2 bus 15, 17 for coupling to multiple PHY devices. In addition, each client is coupled to a host processor 18 via a microprocessor port 19, 21. Exemplary clients are the ASPEN® and ASPEN Express™ devices from TranSwitch Corp., Shelton, Conn. These devices can also operate as bus master, include UTOPIA Level 2 ports, as well as host processor ports.

As shown in FIG. 1, both the primary client 14 and the backup client 16 are bidirectionally coupled to the CellBus® backplane 10 with a transmit address and a receive address. These addresses are configured by the host processor which, in the past, assigned the same transmit and receive address to a particular client. That is, although clients would have a different address from each other, each client's transmit address was the same as its receive address. According to the invention, the clients are made capable of being assigned different transmit and receive addresses. More particularly, according to the invention, each primary and backup client pair are assigned the same receive address but different transmit addresses. As illustrated in FIG. 1, the "primary" client 14 is assigned a transmit and receive address of four (100 binary). The backup client 16 is assigned the same receive address of four (100) but a different transmit address of five (101) according to an addressing algorithm which inverts the last digit of the backup transmit address.

The operation of the CellBus® clients remains unaffected. The provision of different transmit and receive addresses for a client enables the host processor to be programmed to automatically transfer primary client operations to the backup client in the event of malfunction of the primary client.

The invention does not require any modification to the CellBus® protocol. During receive operations, the primary and backup client pair both perform the same data cell authentication by comparing the Bit Interleaved Parity (BIP-8) calculated locally with the received BIP-8. A host processor coupled to the clients monitors the presence of alarms and directs the switch over from primary to backup when an alarm indicates a failure in the primary. Prior to switch over the backup client does not transmit any real data but only transmit a "keep alive" signal indicating that it is functioning properly and available to take over the functions of the primary client.

There have been described and illustrated herein methods and apparatus for providing redundancy in an asynchronous data transfer and source traffic control system. While particular embodiments of the invention have been described, it is not intended that the invention be limited thereto, as it is intended that the invention be as broad in scope as the art will allow and that the specification be read likewise. Thus, while a particular addressing algorithm been disclosed, it will be appreciated that other methods of assigning addresses could be utilized so long as the primary and backup clients have the same receive address but different transmit addresses. It will therefore be appreciated by those skilled in the art that yet other modifications could be made to the provided invention without deviating from its spirit and scope as so claimed.

The invention claimed is:
1. A method for providing redundancy in an asynchronous data transfer and source traffic control system, comprising:
 a) configuring a primary bus client to have a transmit address x and a same receive address x, and
 b) configuring a backup bus client to have a receive address x and a transmit address y, where y is a number different from x;
 c) monitoring the operation of the primary bus client; and
 d) transferring operations from the primary bus client to the backup bus client when a primary bus client failure is detected.
2. The method according to claim 1, wherein:
 x is a first binary number and y is a second binary number which differs from x only in a least significant digit.
3. The method according to claim 1, wherein:
 the primary bus client and the backup bus client are coupled to a bidirectional bus controlled by a bus master.
4. The method according to claim 3, wherein:
 data is transmitted on the bidirectional bus in a repeating frame.
5. The method according to claim 4, wherein:
 the bus clients request access to the bus at the beginning of the frame and the bus master grants access at the end of the frame.
6. The method according to claim 4, wherein:
 the repeating frame contains 48 bytes of data.
7. The method according to claim 4, wherein:
 the bus is thirty-two bits wide.

8. The method according to claim 7, wherein:
the repeating frame is fifteen clock cycles.
9. The method according to claim 7, wherein:
the repeating frame is sixteen clock cycles.
10. The method according to claim 1, wherein:
said monitoring and transferring are performed by a host processor coupled to the primary and backup clients.
11. The method according to claim 1, wherein:
said configuring a primary bus client and configuring a backup bus client are performed by a host processor coupled to the primary bus client and the backup bus client.
12. An apparatus for providing redundancy in an asynchronous data transfer and source traffic control system, comprising:
  a) a primary bus client configured to have a transmit address x and a same receive address x, and
  b) a backup bus client configured to have a receive address x and a transmit address y, where y is a number different from x.
13. The apparatus according to claim 12, wherein:
x is a first binary number and y is a second binary number which differs from x only in a least significant digit.
14. The apparatus according to claim 13, further comprising:
  c) means for monitoring the operation of the primary bus client and transferring operations from the primary bus client to the backup bus client when a primary bus client failure is detected.
15. The apparatus according to claim 14, wherein:
said means for monitoring and transferring includes a host processor coupled to the primary and backup clients.
16. The apparatus according to claim 12, further comprising:
  c) a bidirectional data bus; and d) a bus master, wherein said primary bus client, said backup bus client, and said bus master are coupled to said bidirectional data bus.
17. The apparatus according to claim 16, wherein:
data is transmitted on said bidirectional bus in a repeating frame.
18. The apparatus according to claim 17, wherein:
said repeating frame includes a request field at the beginning of the frame where bus clients request access to the data bus and a grant field at the end of the frame where the bus master grants access to the data bus.
19. The apparatus according to claim 17, wherein:
the repeating frame contains 48 bytes of data.
20. The apparatus according to claim 17, wherein:
the bus is thirty-two bits wide.
21. The apparatus according to claim 20, wherein:
the repeating frame is fifteen clock cycles.
22. The apparatus according to claim 20, wherein:
the repeating frame is sixteen clock cycles.
23. The apparatus according to claim 12, further comprising:
  c) means for configuring the transmit and receive addresses of said primary and backup bus clients.
24. The apparatus according to claim 23, wherein:
said means for configuring includes a host processor coupled to the primary and backup clients.

* * * * *